April 14, 1925.
N. REMILLONG
GARMENT HANGER
Filed Dec. 4, 1923
1,533,661
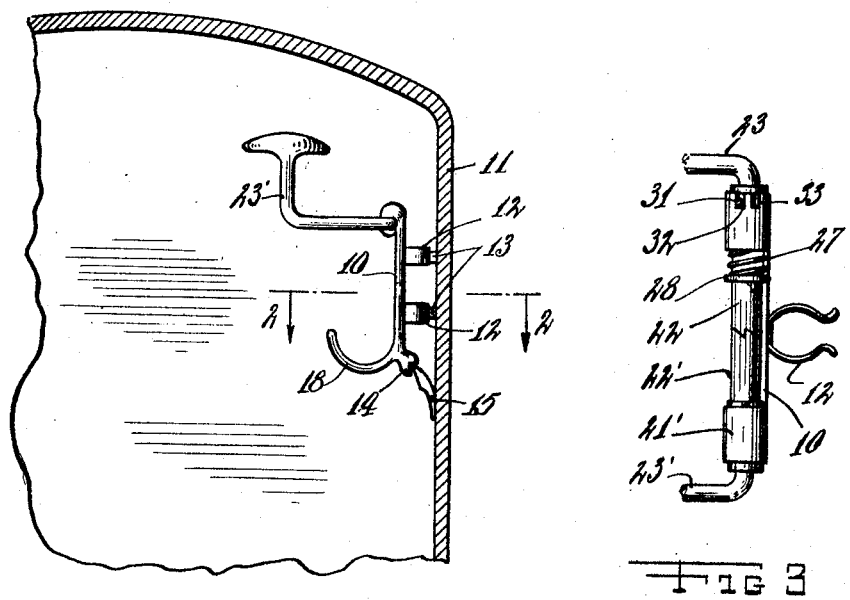
Fig. 1
Fig. 3
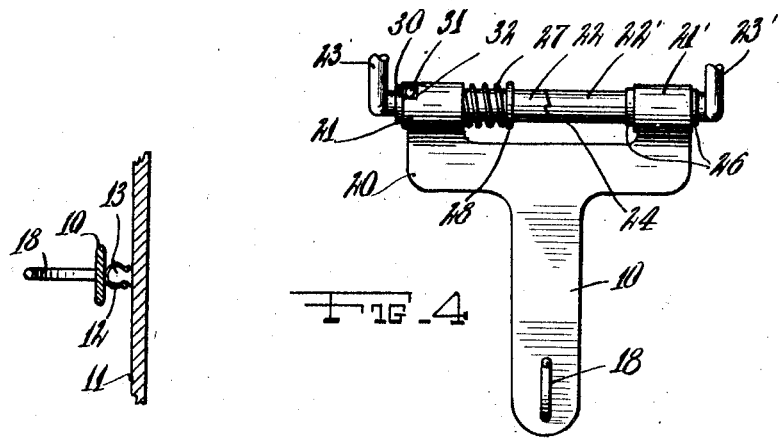
Fig. 2
Fig. 4
INVENTOR
Nick Remillong
BY
ATTORNEY Patented Apr. 14, 1925.

1,533,661

UNITED STATES PATENT OFFICE.

NICK REMILLONG, OF GLEN ULLIN, NORTH DAKOTA.

GARMENT HANGER.

Application filed December 4, 1923. Serial No. 678,416.

*To all whom it may concern:*

Be it known that I, NICK REMILLONG, a citizen of the United States, residing at Glen Ullin, in the county of Morton and State of North Dakota, have invented certain new and useful Improvements in Garment Hangers, of which the following is a specification.

This invention relates to a garment hanger intended more particularly for application to automobiles, although the invention may be applied wherever it may be desirable.

The invention has for an object the provision of a novel and improved garment hanger having a number of hooks capable of adjustment according to the use to which the hanger is to be put.

For further comprehension of the invention, and of the objects and advantages thereof, reference will be had to the following description and accompanying drawing, and to the appended claims in which the various novel features of the invention are more particularly set forth.

Fig. 1 of the drawing is an edge view of my improved hanger indicating it as mounted on the wall of an automobile body.

Fig. 2 is a horizontal sectional view taken on the line 2—2 of Fig. 1.

Fig. 3 is a top plan view of the hanger.

Fig. 4 is a face view.

As here embodied my improved hanger comprises a strap 10 of suitable dimension and which is provided on its rear face with suitable means for mounting it on the wall 11 to which the hanger is to be placed, the strap being here shown as provided with a pair of spring clips 12 which engage projections 13 on the said wall, the strap being also provided with an obliquely downwardly facing socket element 14 on its lower end which engages in a projection 15 carried by the said wall. Fixed to the lower end of the strap is a hook 18 which is adapted to support coats or wraps or the like.

Formed on the upper end of the strap 10 is a cross-piece 20 which has a pair of bearing elements 21, 21' projecting upward from its ends, these bearing elements being adapted to support an adjustable element which may be arranged to carry hats, or to have coats or the like suspended therefrom. This adjustable element comprises a pair of alined rods 22, 22' which are supported in the respective bearings 21, 21' and which have forwardly projected hook elements 23, 23' thereon at their removed ends. The adjacent ends of these rods are formed with ratchet toothed elements 24 which engage one another, whereby the rod 22' is supported from downward swinging movement by the rod 22, the latter being removably locked to the bearing member 21.

The rod 22' is held against longitudinal movement in the bearing 21 by means of collars 26, while the rod 22 is arranged for longitudinal movement in the bearing 21 and is surrounded by a coiled expansion spring 27 which bears between the inner end of the bearing 21 and the flange 28 on the rod, thereby holding the two ratchet faced rod ends in engagement with each other. The rod 22 has fixed thereto a collar 30 which is adjacent the outer end of the bearings 21, and which carries a stud 31 which is adapted to engage in the selected one of a pair of notches 32, 33 in the said bearing to hold the said rod against swinging movement and in consequence support the two hook elements in adjusted positions.

Assuming the parts to be in the position shown in Fig. 1, with the hook elements raised to position to receive hats, and that it is desired to lower the said hook elements to a position one on each side of the hook 18 to receive coats the hook element 23' is first swung slightly upward, thus causing the rod 22' to rotate and forcing the other rod 22 longitudinally in a direction to free the studs 31 thereon from the notch 32 in which it is engaged. The two hook elements may then be swung downward to act as coat supports. Also, the hook elements may be adjusted to a position swung close to the wall of the automobile and retained in that position by the engagement of the stud 31 in the other notch 33.

While I have illustrated and described a preferred embodiment of my invention it is to be understood that I do not limit myself to the precise construction herein shown and that various changes and modifications might be made therein without departing from the spirit and scope of the invention as defined in the appended claims.

Having thus described my invention what I claim as new and desire to protect by

Letters Patent of the United States is as follows:

1. A garment hanger comprising a body member, a pair of alined rods mounted rotatably thereon, hook elements projecting from the remote ends of said rods, ratchet clutch elements on the adjacent ends of said rods engaged with each other to cause one of said rods to be retained against rotary movement in one direction by the other rod, and a stud on the other rod removably engaged with a notch in the said body member to retain the said other rod against rotary movement.

2. A garment hanger comprising a body member, a pair of alined rods one of which is rotatably mounted on said body member and the other of which is both rotatably and slidably mounted on said body member, hook elements projecting from the remote ends of said rods, ratchet clutch elements on the adjacent ends of said rod engaged with each other to cause the first named rod to be retained against rotary movement in one direction by the other rod, a stud fixed on the last named rod and engaging in a notch in said body member and adapted to be disengaged therefrom by sliding movement of the rod, and a spring engaged with said last named rod and acting to hold the latter in position with the said ratchet clutch elements engaged with each other and said stud engaged with said notch.

In testimony whereof I have affixed my signature.

NICK REMILLONG.